United States Patent [19]

Barbier et al.

[11] 4,438,152

[45] * Mar. 20, 1984

[54] PROCESS OF GASEOUS OPALIZATION OF LIGHT BULBS

[75] Inventors: Jean-Paul Barbier, Fontenay-le-Fleury; Gilbert Lerouyer, Orgerus, both of France

[73] Assignee: L'Air Liquide - Societe Anonyme pour l'Etude et l'Exploitation des Procedes Georges Claude, Paris, France

[*] Notice: The portion of the term of this patent subsequent to Feb. 15, 2000 has been disclaimed.

[21] Appl. No.: 375,085

[22] Filed: May 5, 1982

[30] Foreign Application Priority Data

May 20, 1981 [FR] France ................................. 81 10059

[51] Int. Cl.³ .................... B05D 3/04; B05D 7/22; C03C 17/345
[52] U.S. Cl. ..................................... 427/37; 427/106; 427/107; 427/167; 427/237
[58] Field of Search ................. 427/37, 106, 107, 167, 427/237

[56] References Cited

U.S. PATENT DOCUMENTS

| | | | |
|---|---|---|---|
| 2,967,113 | 1/1961 | Liebhafsky et al. | 427/107 |
| 4,334,903 | 6/1982 | MacChesney et al. | 427/237 |
| 4,349,582 | 9/1982 | Beerwald et al. | 427/238 |
| 4,374,157 | 2/1983 | Barbier et al. | 427/37 |

*Primary Examiner*—John H. Newsome
*Attorney, Agent, or Firm*—Browdy & Neimark

[57] ABSTRACT

In a process of gaseous opalization a film of silica is formed by an oxidation reaction with a dry gas containing oxygen. Pure oxygen or oxygen diluted in an inert gas, other than nitrogen, may be used. An electric arc is generated by an alternating voltage between 5,000 and 10,000 volts and is directed at a chlorinated silicon compound, entrained by the dry gas containing oxygen, the feeding of which gas carrier does not form silica on the electrodes which generate the arc. This process may be applied to the opalization of incandescent and discharge bulbs of various sizes including tubes and globes of lighting apparatus.

7 Claims, 1 Drawing Figure

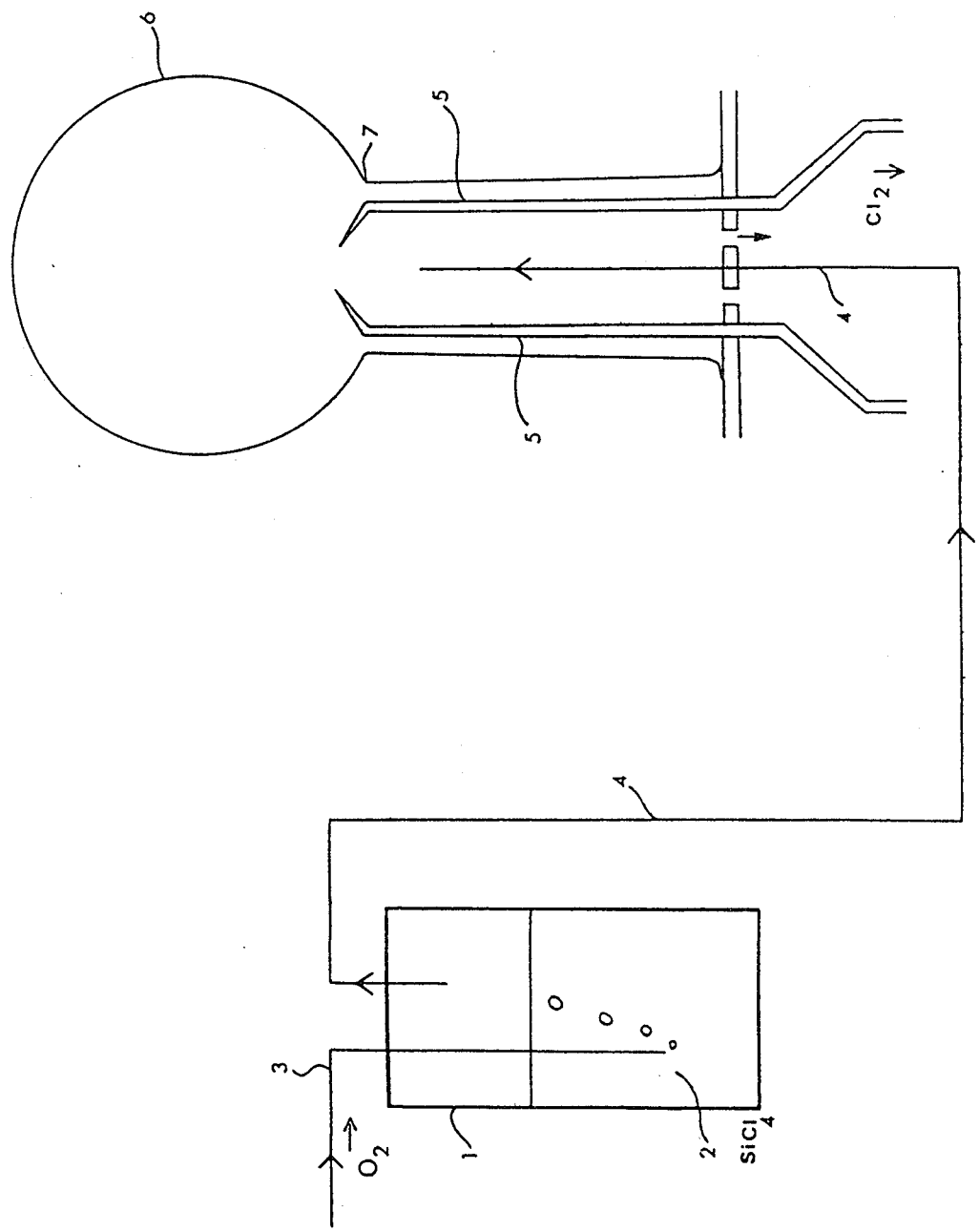

PROCESS OF GASEOUS OPALIZATION OF LIGHT BULBS

FIELD OF THE INVENTION

This invention relates to a process involving gaseous opalizing of light bulbs, such as incandescent and discharge tubes and globes.

The opalization operation comprises forming a deposit of white product, which diffuses light such as titanium dioxide, silica, or alumina; a suitable thick coating having sufficient adherence should be formed.

BACKGROUND OF THE INVENTION

Various methods of opalizing light bulbs have been proposed and, at the industrial level, two known process are used.

According to the process known as the "wet process", a suspension of titanium dioxide, carried in a liquid that is evaporated by bringing the bulb to a temperature of 400° to 500° C., is deposited on the inside of the light bulb.

According to another process known as the "dry process", a film of silica containing titanium dioxide is applied by spraying a powder on the inside of the light bulb.

Gaseous opalization methods are also known, but they are very few in number and do not appear to be adapted for use in industry. The formation of deposits of titanium dioxide by hydrolysis of titanium compounds, such as titanium tetrachloride, is taught in U.S. Pat. No. 3,352,703. According to this patented process, vapors of moist air and titanium tetrachloride are passed through an electric arc. The moist air is produced by bubbling air in water. At the start, the electric arc is generated at an alternating voltage of about 5,000 volts, after striking, the alternating voltage is maintained at about 1,100 volts. French patent application No. 2,304,169 relates to a process of forming a white light diffusible deposit on a wall of transparent glass by the combustion of a mixture of hydrogen, air and a vapor comprising at least an organic silicon compound. According to this technique, the particles coming from the combustion fumes of said gaseous mixture are directed and their distribution controlled, in terms of thickness, by means of an electric field that prevails around and in the bulb. According to German application 2906038 it is known how to form a deposit of silica and boron oxides from a gaseous mixture of $SiCl_4$ and $BCl_2O_3$, which is subjected to a pyrolysis or hydrolysis treatment. Alumina deposits can also be produced by the combustion of organic aluminum compounds, which are dissolved in a solvent, taught in U.S. Pat. Nos. 3,842,306 and 3,868,266. In U.S. Pat. No. 3,109,747 there is described the production of a silica deposit by the combustion of tetraethyl silicate by producing a process involving several relatively complex stages.

OBJECTS AND SUMMARY OF THE INVENTION

Knowing that silica would be the most effective compound for opalizing light bulbs and for making light diffusing glasses, it should be noted that the application, by spraying, of pure silica powder does not result in a satisfactory adherence to the glass surface. Since the fine powdered silica employed for this purpose is an expensive product which is specially prepared from silicon compounds, a process of depositing fine silica powder directly on the light bulb diffusing surface, that would result in coating with satisfactory adherence was sought.

A method of opalization has been discovered that makes possible an excellent luminous transmission by producing a silica deposit entirely by a more simple, quick and economical gaseous process as compared with the known methods. The equipment for practicing the new opalizing technique is easily integrated into a light bulb production line, thus making it possible to achieve savings in labor.

According to the invention, the process of gaseous opalization, involving in-situ formation of silica powder, consists in depositing on the inner surface of a light bulb a film of silica obtained by oxidation of a chlorinated silicon compound by a dry gas containing oxygen, in the presence of an electric arc.

BRIEF DESCRIPTION OF THE DRAWING

For accomplishing the above purposes and others, which will be apparent to those of ordinary skill in the art, the description below of the invention herein when taken in conjunction with the following figure of the drawing will be found to be useful, wherein:

The FIGURE is a schematic representation of a particular means for gaseously opalizing a light bulb surface.

DETAILED DESCRIPTION OF PREFERRED EMBODIMENTS

The chlorinated compound used in the opalizing process is selected from the group consisting of monochlorosilane, dichlorosilane, trichlorosilane and silicon tetrachloride. This last chlorinated silicon derivative, a large-scale industry product, exhibits an unquestionable economic advantage and an undeniable technical advantage over those used in the prior art processes.

The equation representing the oxidation of silicon tetrachloride, which is written: $SiCl_4 + O_2 \rightarrow SiO_2 + 2Cl_2 \uparrow$ shows the absence in this reaction of the formation of water, which constitutes a poison for the filament of light bulbs, from which even traces of water moisture must be removed before attaching the filament thereto. Moreover, in this reaction silicon tetrachloride does not result in the formation of wet hydrochloric acid, which is a highly corrosive and destructive agent with respect to the filament, but rather in the chloride ion itself.

Because of this, the overall advantage of using a dry gas containing oxygen as an oxidation gas, wherein the oxidizing gas can be pure oxygen or oxygen diluted in an inert gas, is understood. The use of nitrogen as an inert diluent, or of air as an oxidizing mixture, is not particularly recommended because of the toxicity of the nitrogen oxides which would be formed and the reddish vapors, the presence of which risks causing a discoloration of the silica deposit, even though such vapors can disappear naturally or can be desorbed by gaseous scavenging.

The opalization efficiency is determined by the ratio of the silica mass actually deposited to the theoretical mass which should have been deposited.

The electric arc functions to make oxidation possible and, thus, produces the silica deposit by oxidizing the silicon tetrachloride compound. It has been noted that the use of an electric arc is necessary for the formation of a satisfactory silica deposit. The electrification of the silica particles also makes them adhere more strongly to the glass surfaces.

Any type of electric arc under high voltage can be used in the opalizing process; the arc supplied by alternating current is very well suited for this purpose. The formation of the silica deposit on the inner face of the light bulb depends on the voltage applied across the terminals of the electrodes which generate the arc. The voltage must be greater than several thousand volts, such that the high voltage applied is between 5,000 and 10,000 volts. Operation below 5,000 volts results in a drop in the opalization efficiency.

The silicon tetrachloride having a high vapor tension, i.e., 193 millimeters at 20° C., is entrained by the dry gas containing oxygen and is introduced into the light bulb by centered piping, opening at a suitable distance below the tip of the electrodes, which are located on both sides of the gas intake.

The speed of forming the silica deposit is, on the one hand, a function of the amount of voltage applied to the electrodes generating the arc and, on the other hand, a function of the velocity of gaseous delivery. It has been found that a decrease in the gaseous delivery velocity increases the opalization time, whereas too great an increase in the gaseous delivery velocity causes a drop in the opalization efficiency.

To opalize a clear, standard type light bulb, the gaseous delivery velocity must be advantageously between 10 and 30 l/h.

The concentration of the silicon tetrachloride in the gaseous mixture depends on the temperature of the tetrachloride liquid. In actual fact, a slight amount of silicon tetrachloride is needed in the carrier gas for opalizing and very satisfactory results are obtained at ambient temperature. If it is desired to lower the vapor tension of the silicon tetrachloride in the carrier gas, cooling the silicon tetrachloride, or increasing the rate of delivery of the carrier gas, can be considered.

The process is used in simple equipment, comprising a volume (1) containing silicon tetrachloride (2) while the carrier gas containing oxygen is introduced into the $SiCl_4$ by plunger tube (3). After bubbling in through the $SiCl_4$, the carrier gas that entrains the $SiCl_4$ leaves the volume by piping (4) and is carried to the interior of the light bulb in said centered piping which opens at a suitable distance below the tip of the electrodes (5). It has been found that the positioning of the intake opening of gas current at two-thirds of the neck in the case of a light bulb (6) from the base with interaction of the arc (7) at the top of the neck represents optimal conditions for obtaining excellent opalization as far as quality of the deposit and efficiency of the process are concerned.

The process is applicable to opalization of incandescent and discharge bulbs of various sizes including tubes and to bulbs of lighting apparatus.

Opalization of tubes can be performed by applying a translation of the tube parallel to the axis formed by the electrodes and the axis of the tube; the length of the electrodes and the tube introducing the gas are at the minimum equal to that of the tube to be opalized.

Examples which illustrate the invention, in a nonlimiting way, are given below.

EXAMPLE 1

In a clear standard size light bulb, with a total height of 127 millimeters, the diameter of which is 60 millimeters in the spherical part, 36 millimeters at the bottom of the neck and 33 millimeters at the top of the neck, using the apparatus described previously, the silicon tetrachloride is entrained by an oxygen current the delivery of which is 10 liters/hour, and is introduced into the light bulb for two minutes by the centered piping, having a nozzle diameter of 2 millimeters which opens at a distance of about 20 millimeters under below the tip of the electrodes which are located on both sides of the gas intake. A gap between the electrode tips of about 10 millimeters is maintained. The voltage which is applied to the electrodes generating the arc is 8,000 volts while the strength of the alternating current is 25 mA. A satisfactory opalization corresponding to a deposit of 70 mg of silica, at an operating efficiency of 33%, is obtained.

EXAMPLE 2

Under the same conditions of equipment, positioning of electrodes, voltage, amperage, and nozzle diameter of the gas intake, a test is performed with an oxygen delivery of 36 l/h, by passing the gaseous mixture in a clear standard size light bulb for 1.30 minutes. A homogenous deposit of 70 mg of silica at an operating efficiency of 12% is obtained.

EXAMPLE 3

Under identical conditions of equipment, positioning of electrodes, voltage, amperage, and nozzle diameter of the gas intake, a test is performed with an oxygen delivery of 25 l/h. At the end of 1.30 minutes of introduction of the gaseous mixture in a clear standard light bulb size a homogenous deposit of 78 mg of silica at operating an efficiency of 20% is obtained.

EXAMPLE 4

Under the same conditions as described above, but with an oxygen delivery of 5 l/h, by passing the gaseous mixture for 2 minutes in a clear standard size light bulb, a homogenous deposit of 57 mg of silica of an operating efficiency of 54% is produced.

We claim:
1. A process for the gaseous opalization of light bulbs by producing a silica film on the inner surface of the light bulb, comprising:
   entraining a chlorinated silicon compound selected from the group consisting of monochlorosilane, dichlorosilane, trichlorosilane and silicon tetrachloride in a dry carrier gas containing oxygen;
   delivering said carrier gas containing oxygen and entrained chlorinated silicon compound into the presence of an electric arc, generated by an alternating voltage between 5,000 and 10,000 volts, within the light bulb.
2. A process as claimed in claim 1 wherein the dry gas which contains oxygen is selected from the group consisting of pure oxygen and oxygen diluted in an inert gas, other than nitrogen.
3. A process of opalizing light bulbs according to claims 1 or 2, wherein the chlorinated compound is silicon tetrachloride, and wherein the delivery rate of the carrier gas containing oxygen and entrained silicon tetrachloride, which is introduced into the light bulb, is between 10 and 30 liters/hour.
4. A process in accordance with claims 1 or 2, wherein said light bulbs comprise incandescent discharge light bulbs or tubes of various sizes.
5. A process in accordance with claim 3, wherein said light bulbs comprise incandescent and discharge light bulbs or tubes of various sizes.
6. An opalized light bulb produced in accordance with a process in accordance with claim 4.
7. An opalized light bulb produced in accordance with a process in accordance with claim 5.

* * * * *